Jan. 17, 1950  T. L. FINLEY  2,494,800
AUTOMATIC FISHING DEVICE
Filed June 9, 1945  2 Sheets-Sheet 1
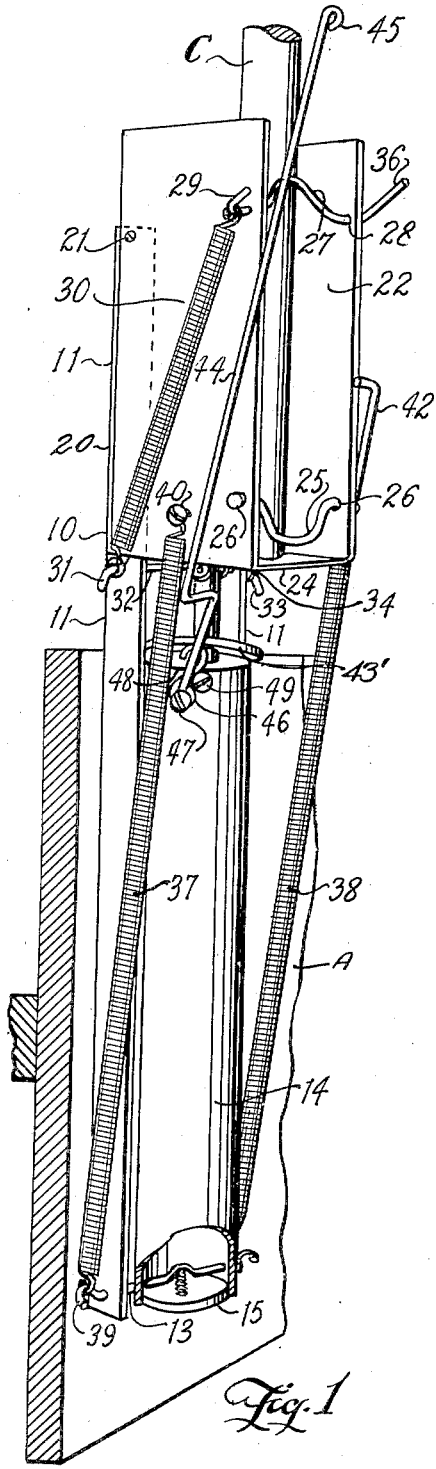
Fig. 1
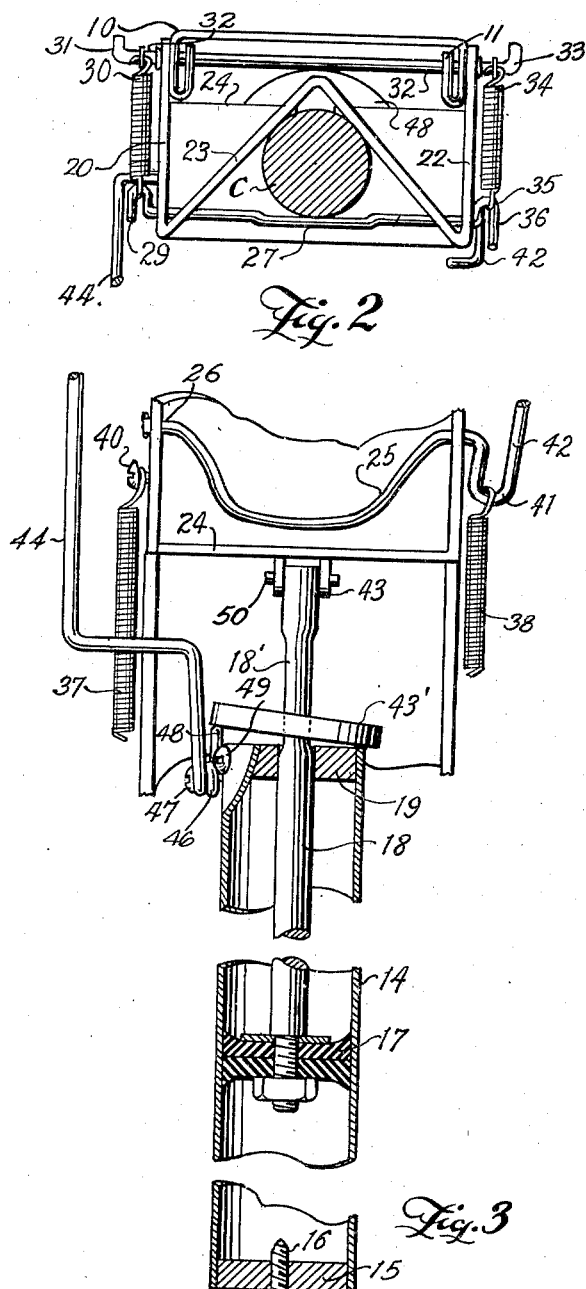
Fig. 2
Fig. 3
Inventor
Tilbert L. Finley
Attorneys Jan. 17, 1950  T. L. FINLEY  2,494,800
AUTOMATIC FISHING DEVICE
Filed June 9, 1945  2 Sheets-Sheet 2
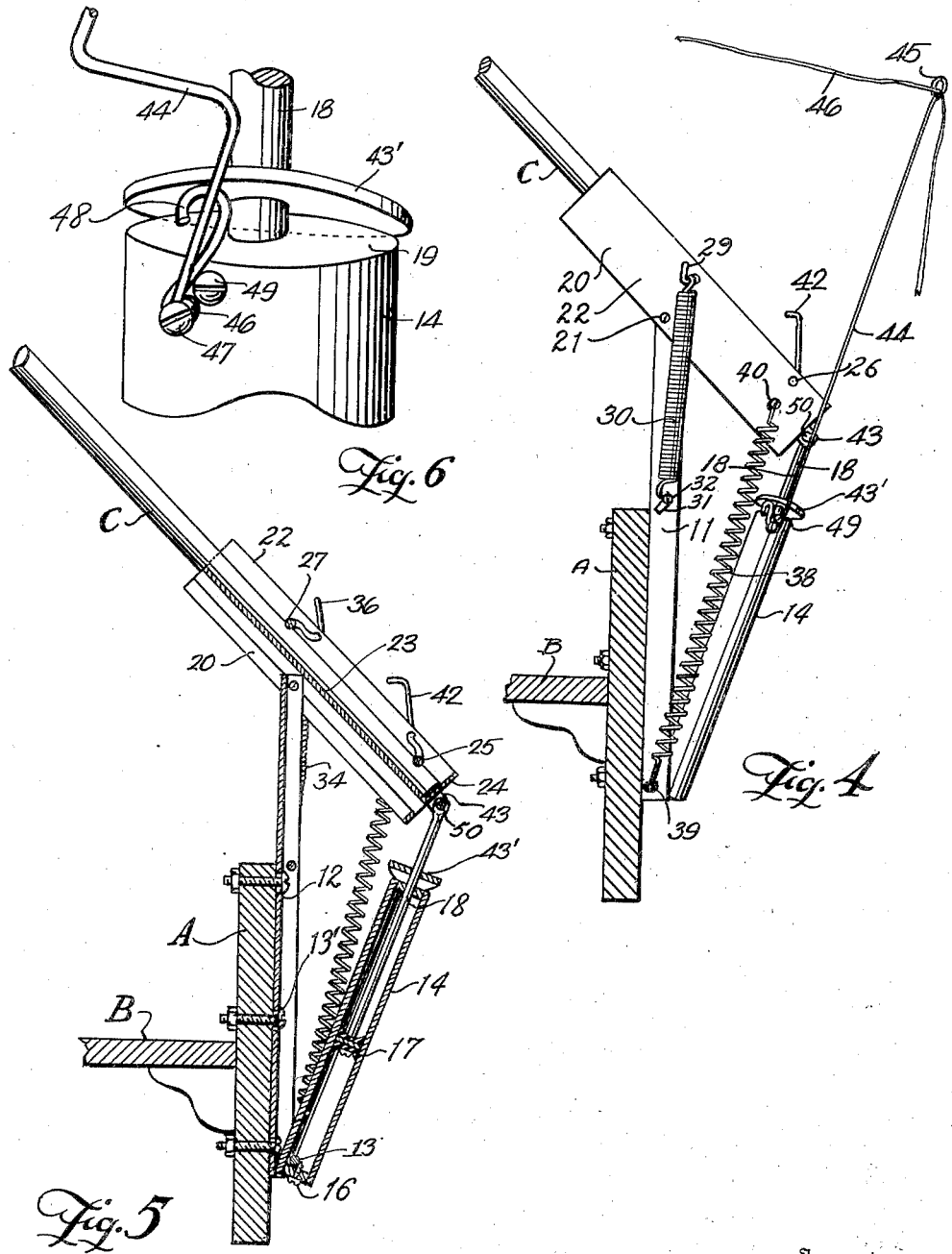
Inventor
Tilbert L. Finley
By Jack Ashley
Joseph H. Ashley
Attorneys Patented Jan. 17, 1950

2,494,800

UNITED STATES PATENT OFFICE 2,494,800

AUTOMATIC FISHING DEVICE

Tilbert L. Finley, Bonham, Tex.

Application June 9, 1945, Serial No. 598,602

7 Claims. (Cl. 43—15)

This invention relates to new and useful improvements in automatic fishing devices.

One object of the invention is to provide an improved device which may be attached to a relatively stationary support having means for holding a fishing pole and being provided with tripping and swinging means, whereby the fishing pole is swung upward to pull the line when a fish strikes the hook.

A particular object of the invention is to provide an improved device which when tripped will exert a steady and rapid pull on the fishing line, but at the same time will cushion or modulate the swinging action, whereby the operation will be smooth and the shock resulting from the spring force will be largely absorbed.

Another object of the invention is to provide an improved device having means whereby an ordinary fishing pole may be secured thereto and released therefrom in a simple and expeditious manner.

Still another object of the invention is to provide an improved fishing pole device which may be set or cocked at various angles, the amplitudes of which are not limited by latches and/or notches.

A further object of the invention is to provide an improved device which is simple and substantial in structure and which avoids the use of hooks and latches and the like, but employs a spring actuated plunger and a cushioning cylinder with a friction retainer coacting with the plunger to hold the device in set positions and to quickly release it for free action.

A construction designed to carry out the invention will be hereinafter described together with other features of the invention.

The invention will be more readily understood from a reading of the following specification and by reference to the accompanying drawings, wherein an example of the invention is shown, and wherein:

Fig. 1 is a perspective view of an automatic fishing device constructed in accordance with the invention, mounted on the gunwale of a boat and in an upright position, Fig. 2 is a plan view of the same, Fig. 3 is a partial view of the device, partly in elevation and partly in section, Fig. 4 is a transverse sectional view of the device in one of its fishing positions, Fig. 5 is a side elevation of the same, and Fig. 6 is a partial elevation showing the friction retainer.

In the drawings, the numeral 10 designates an upright channel-shaped bracket or standard, which is provided along each side with outwardly directed longitudinal flanges 11. This bracket may be made of sheet metal, or any suitable material, and is provided at its central portion with vertically spaced keyhole slots 12 spaced vertically from its lower end upwardly, so as to be engaged over the heads of bolts 13' on the inner face of the combing A of the gunwale B of a boat or any other suitable supporting portion thereof. It is to be understood that the mounting of the bracket is not limited to a boat, but could be effected on any suitable support on a fishing pier, a raft, or other structures suitable for the purpose. By the use of keyhole slots, the bracket may be readily placed and removed.

A fulcrum rod 13 extends transversely across the lower end of the bracket, and is mounted to rock in the flanges 11. The medial portion of the rod is curved so as to be suitably secured to the lower end of a cushioning or checking cylinder 14, which has a plug 15 in its lower end provided with a small screw 16 for regulating the passage of air similar to an ordinary door check. The rod may pass through the rear side of the cylinder just above the plug, and thus provides a fulcrum or hinge whereby the cylinder may be swung outwardly, as shown in Figs. 4 and 5. Within the cylinder is an ordinary plunger head 17 mounted on the lower end of a plunger rod 18, which has a snug sliding fit in a cap 19 countersunk in the upper end of the cylinder in any suitable manner.

A generally U-shaped saddle 20 is mounted on pivots 21 at the upper ends of the flanges 11. The flat sides or wings 22 of the saddle straddle or override the flanges 11 so as to extend outwardly therefrom and the metal from the saddle is bent inwardly along the outer vertical edges of the saddle to form an inwardly directed V-shaped trough or seat 23. The pivots 21 are disposed nearer the upper ends of the wings so as to give to the lower portion of the saddle the necessary outward swing and leverage.

The function of the saddle is to receive and hold the fishing pole C, and the saddle is provided with a transverse outwardly directed bottom plate 24 for receiving the butt end of the pole. The plate terminates short of the inner vertical margins of the wings of the saddle so as to permit said wings to straddle the flanges when the saddle is swung to an upright position. An arcuate yoke or retainer 25 has its ends journaled in apertures 26 in the wings. The inner end of the fishing pole is engaged under this yoke, the curvature of which is ample to accommodate poles of various diameters. A similar yoke 27 is journaled in apertures 28 near the upper ends of the wings to cooperate with the yoke 25 in retaining the pole.

The left hand end of the yoke 27 (Figs. 1 and 2) is bent to form a hook 29, and the upper end of a coiled spring 30 is engaged on this hook, while its lower end is engaged over a downturned hook 31 formed on the end of a transverse rod 32 journaled in the flanges 11 below the wings 22. The opposite or right hand end of the rod 32 is bent downwardly to form a second hook 33 on which the lower end of a coiled spring 34 is engaged. The upper end of the spring 34 is engaged in a loop 35 formed on the right hand end of the yoke 27 outside of the adjacent flange 11, the outer leg of which loop is bent upwardly to form a handle 36. It will be observed that the curved medial portion of the yoke 27 is bent upwardly and the hook 29, as well as the loop 35, inclined downwardly as shown in Fig. 2, which, together with the rearward and downward inclination of the springs, causes the yoke to rock and thus frictionally engage the fishing pole and retain it in the saddle.

Elongate coiled springs 37 and 38, respectively, have their lower ends engaged over hooks 39 formed on the outer end of the rod 13. The upper end of the spring 37 is engaged over a stud 40 secured in the lower central portion of the left hand wing of the saddle (Figs. 1 and 3), whereby said spring is given an outward and upward inclination when the saddle is in its vertical position. The spring 38 has its upper end engaged in a loop 41 formed on the outer end of the yoke 25, and the outer leg of this loop is bent upwardly to form a handle 42. It will be observed that the yoke 25 is curved downwardly, and therefore the spring 38 acts to hold the yoke in frictional engagement with the butt end of the fishing pole C. By swinging the handles 36 and 42, the yokes may be swung for inserting and removing the fishing pole.

The springs 37 and 38 also have the function of retrieving the fishing pole by swinging the saddle to an upright position. The upper end of the plunger rod 18 has a cross pin 50 secured therein with its ends journaled in ears 43, the rod being between the ears which are on the under side of the plate 24; consequently, when the saddle is swung to cock or set the retriever, the plunger 18 is pulled upwardly, and the cylinder 14 is swung outwardly as shown in Figs. 4 and 5. This places the springs 37 and 38 under tension, so as to swing the elements to their upright positions when the device is released. The fishing pole C, having been inserted in the saddle, may be used as a lever in swinging the saddle outwardly.

A very important feature of the invention resides in the means for retaining the device in cocked position, and this means includes an ordinary disk or washer 43′, which surrounds the plunger rod 18, and rests upon the top of the cylinder 14. The upper portion of the rod 18 is reduced in diameter as is indicated at 18′. This permits the washer to be freely canted when the device is in an upright position. For operating the washer, a tripping lever 44 is provided. This lever, which extends upwardly beyond the saddle, has an eye 45 at its upper end to which the fishing line may be attached. The lower end of the lever is bent inwardly at substantially right angles and provided with a coil 46 at its lower end mounted on a small screw 47 in the upper end of the barrel. This coil is formed with an upstanding loop or bill 48 which engages under the washer so as to cant the latter when swung to an upright position. The members 13, 25, 27, 32, and the lever 44, may be made of heavy wire, and thus easily bent to the desired positions. As is shown in Fig. 1, it is desirable to form the lever so that when the loop 48 is in an upright position, the lever will be inclined slightly inwardly or rearwardly with relation to the forward extension of the fishing pole, and in order to assure such position, a stop screw 49 mounted in the upper end of the cylinder is engaged by the loop. When the device is released by pulling the lever outwardly or forwardly, the loop is swung away from the stop screw and also the washer 43′ is permitted to drop to a horizontal position, and thereby release the plunger rod.

In using the device, it is mounted on a suitable support, such as the combing A, in a released or upright position, as shown in Fig. 1. The lever 36 is swung downwardly so as to permit the end of the fishing pole to be passed under the yoke 27 and slid down the trough 23. The lever 42 is then swung to swing the yoke 25, whereby the butt end of the pole may be passed under this yoke and brought into engagement with the plate 24.

The fishing line, which has been passed through the eye (not shown) on the outer end of the fishing pole, is then secured to the loop 45. If desired, the end of the line may be carried beyond the eye 45 and tied to a suitable fastening on the boat or other structure, sufficient slack being given to permit free operation. This would prevent a large fish from running off with the line, even though the lever 44 might be bent or broken. However, usually, it will be sufficient to merely attach the fishing line to the eye of the lever.

The fisherman then grasps the pole C and swings it outwardly and downwardly to the angle at which he desires to fish. In setting or cocking the device, the fisherman uses one hand with which to swing the pole outwardly, and with his other hand, swings the lever 44 inwardly or rearwardly so as to cant the washer 43′ and maintain it in position. The reduced portion 18′ of the plunger rod 18 permits the washer to be freely moved to its canting position. As the cylinder 14 is swung outwardly, the plunger rod 18 will be pulled upwardly in the cylinder by the swinging saddle 22. This will cause that portion of the rod 18 having the larger diameter to pass through the washer, which, while fitting loosely enough to permit the passage of the rod without tilting upwardly, at the same time will take friction bite or grip on the rod when canted and the outward swinging movement of the saddle is stopped.

From the foregoing, it will be seen that the fishing rod C may be adjusted to any desired angle, because the washer 43′ will frictionally engage the rod 18 at any point below the portion 18′, and thereby fasten the retriever in its adjusted position. When the saddle is swung, the cylinder 14 is also swung, and the tension of the springs 37 and 38 is considerably increased. The device will remain in this position until a fish strikes the hook and pulls the fishing line, whereby the lever 44 will be pulled forward. When the lever 44 is pulled forwardly and outwardly, the loop 48 is swung down and the washer 43′ is thus released, and will fall to a horizontal position, due to its loose fit on the rod 18. Simultaneously, the springs 37 and 38 will swing the saddle and cylinder to an upright position, thus swinging the fishing pole and making the catch. When the device is set or cocked, the plunger head 17 is pulled upwardly in the cylinder 14, and consequently, when the device is tripped, and the springs 37 and 38 return it to its upright position, the plunger head will be forced downwardly into the cylinder, and its downward movement checked, because the screw 16, which is loosely threaded in the plug 15, will restrict the escape of air. This screw may be adjusted to regulate the cushioning action and it is obvious that the swing may be relatively slow, or very rapid, according to the adjustment. Even where the retrieving swing is very rapid, the cushioning action will absorb a large amount of the recoil, and thus reduce the whipping action which would otherwise be imparted to the fishing pole. The screw 16 may be adjusted so that the speed at which the fishing pole swings upwardly is gradually reduced toward the end of the upward swing, owing to the compression of air in the cylinder as the plunger head 17 approaches the bottom thereof. The member 20 may be referred to as a "saddle" or a "retainer" or a "spring impelled actuator." The washer 43', lever 44, coil 46 and bill 48 may be referred to as a "tripping means".

The foregoing description of the invention is explanatory thereof and various changes in the size, shape and materials, as well as in the details of the illustrated construction, may be made, within the scope of the appended claims, without departing from the spirit of the invention.

What I claim and desire to secure by Letters Patent is:

1. An automatic fishing device including, a bracket adapted to be mounted on a support, a saddle pivoted on the bracket having means for mounting a fishing pole thereon, a cushioning cylinder pivoted to the bracket and having a plunger pivoted to the saddle, spring means connected to the saddle and the bracket, and a retaining and releasing device engaging the plunger and having a tripping lever.

2. As a combination in an automatic fishing device, a spring impelled plunger, a washer loosely surrounding said plunger, and means including a lever for canting said washer to frictionally hold the plunger in adjusted positions.

3. An automatic fishing device including, a bracket adapted to be mounted in an upright position on a support, a saddle pivoted on the upper portion of said bracket adapted to receive and hold a fishing pole, a cushioning cylinder pivoted to the bracket below the saddle, a plunger in the cylinder having a rod extending upwardly and pivoted to the saddle, a coiled spring connecting the saddle with the bracket therebelow, a lever pivoted to the cylinder having tripping means and means for attachment of a fishing line, and retaining means engageable by the lever tripping means for frictionally engaging the plunger rod.

4. An automatic fishing device including, a bracket adapted to be mounted in an upright position on a support, a saddle pivoted on the upper portion of said bracket adapted to receive and hold a fishing pole, a cushioning cylinder pivoted to the bracket below the saddle, a plunger in the cylinder having a rod extending upwardly and pivoted to the saddle, a coiled spring connecting the saddle with the bracket therebelow, a lever pivoted to the cylinder and having means for attachment of a fishing line, a washer loosely surrounding the plunger rod, and a projection on the lever engaging under the washer for canting it to frictionally retain the rod in adjusted positions.

5. An automatic fishing device including, a supporting member, a fishing pole retainer pivoted on the support, spring operating means pivoted to the supporting member and to the retainer for swinging the retainer to an upright position, friction tripping means for holding the retainer in an adjusted angular position, cushioning means carried by the support and connected to the retainer coacting with the tripping means, and means for regulating the cushioning means to vary the rapidity with which the retainer is swung to an upright position.

6. An automatic fishing device including, a bracket adapted to be mounted on a support, a saddle pivoted on the upper portion of the bracket having means for mounting a fishing pole thereon, spring impelled means including a cushioning cylinder pivotally connecting the saddle with the lower portion of the bracket, and friction tripping means coacting with the spring means for holding the spring means in a cocked position and having a releasing lever.

7. An automatic fishing device including a supporting member, a fishing pole retainer pivoted on the supporting member, spring operating means pivotally connected to the supporting member and to the retainer, friction tripping means for holding the retainer and the spring means in adjusted position, and a cushioning device connected with the supporting member and the retainer for absorbing the recoil of the spring impelled means.

TILBERT L. FINLEY.

REFERENCES CITED

The following references are of record in the file of this patent:

UNITED STATES PATENTS

| Number | Name | Date |
|---|---|---|
| 279,988 | Smith | June 26, 1883 |
| 562,195 | Plath | June 16, 1896 |
| 693,071 | Rudd | Feb. 11, 1902 |
| 804,510 | Vaughn | Nov. 14, 1905 |
| 832,171 | Sheddan | Oct. 2, 1906 |
| 836,303 | Christensen | Nov. 20, 1906 |
| 874,721 | Adams | Dec. 24, 1907 |
| 1,192,112 | Porter | July 25, 1916 |
| 1,488,838 | Savoie | Apr. 1, 1924 |

FOREIGN PATENTS

| Number | Country | Date |
|---|---|---|
| 7,759 | Great Britain | A. D. 1893 |

Certificate of Correction

Patent No. 2,494,800

January 17, 1950

TILBERT L. FINLEY

It is hereby certified that error appears in the printed specification of the above numbered patent requiring correction as follows:

Column 5, line 44, for the word "combination" read *sub-combination*; and that the said Letters Patent should be read with this correction therein that the same may conform to the record of the case in the Patent Office.

Signed and sealed this 4th day of April, A. D. 1950.

[SEAL]

THOMAS F. MURPHY,
*Assistant Commissioner of Patents.*